United States Patent [19]

Kokaku et al.

[11] Patent Number: 5,300,189
[45] Date of Patent: Apr. 5, 1994

[54] PLASMA SURFACE TREATMENT METHOD AND APPARATUS

[75] Inventors: Yuichi Kokaku; Makoto Kitoh, both of Yokohama; Yoshinori Honda, Fujisawa, all of Japan

[73] Assignee: Hitachi, Ltd, Tokyo, Japan

[21] Appl. No.: 51,701

[22] Filed: May 20, 1987

[30] Foreign Application Priority Data

May 21, 1986 [JP] Japan .................. 61-114562

[51] Int. Cl.[5] .................. B05D 5/00; B01J 15/00
[52] U.S. Cl. .................. 156/643; 156/646; 156/668; 156/345; 204/192.12; 204/192.15; 204/192.32; 204/192.36; 204/298.24; 204/298.26; 204/298.35; 118/723 R
[58] Field of Search ............... 156/643, 345, 668, 646; 204/298.24, 298.26, 298.35, 192.12, 192.15, 192.32, 192.36; 118/718, 719, 723, 50, 50.1, 730; 427/569, 577, 249

[56] References Cited

U.S. PATENT DOCUMENTS

| | | | |
|---|---|---|---|
| 4,013,539 | 3/1977 | Kuehnle | 204/298 |
| 4,322,276 | 3/1982 | Meckel et al. | 204/192 P |
| 4,380,211 | 4/1983 | Shinohara | 204/298 |
| 4,631,105 | 12/1986 | Carroll et al. | 156/345 |

FOREIGN PATENT DOCUMENTS 2485319 12/1981 France .
2080611 2/1982 United Kingdom .

OTHER PUBLICATIONS

Patent Abstracts of Japan, vol. 9; No. 82 (C-275 [1805], 11 Apr. 1985 & JP A-59 213 735 (Kuraray K.K.) Dec. 03, 1984–Abstract.
Patent Abstracts of Japan, vol. 8, No. 199 (C-242) [1636], 12 Sep. 1984; & JP-A-59 91 130 (Matsushita Denki Sangyo K.K.) May 25, 1984.

Primary Examiner—Thi Dang
Attorney, Agent, or Firm—Antonelli, Terry, Stout & Kraus

[57] ABSTRACT

A surface treatment method and apparatus permitting the treatment of a film with plasma with a high treatment speed and a high efficiency without uselessly complicating the construction of a device for realizing it are disclosed. The area where the counter electrode is in contact with the plasma is sufficiently larger than the area where the rotating electrode is in contact therewith. The ratio of the areas is preferably not smaller than 1.5 and the etching speed may be increased to a value more than ten times as great as that obtained by a prior art method.

33 Claims, 4 Drawing Sheets

PLASMA SURFACE TREATMENT METHOD AND APPARATUS

BACKGROUND OF THE INVENTION

This invention relates to a plasma surface treatment method and apparatus for treating a film surface by using plasma with a high efficiency.

There are known techniques for reforming the surface of a substrate made of various materials by making gas in a plasma state act on the surface. For example, for polymers, as discussed in an article entitled "Plasma niyoru Kobunshi Zairyo no Hyomen Shori (Surface Treatment of polymer materials by using plasma)" (Kogyo Zairyo (Industrial Materials), Vol. 32, p.24–30 (1982)), various kinds of applications are conceived, such as techniques, by which hydrophilic radicals are introduced in the surface by making oxygen plasma act thereon in order to improve the adhesivity of paints, plasma etching techniques using ion energy and reactions of active radicals, etc.

If it were possible to effect continuously such a plasma surface treatment on a long film, productivity thereof would be considerably increased. For this reason a continuous plasma surface treating apparatus has been proposed, as disclosed e.g. in JP-A-57-18737.

Also, as known apparatuses similar thereto, there are known continuous plasma surface treating devices disclosed in JP-A-59-91128 and JP-A-59-91130. In these kinds of apparatuses film is rolled on a rotating cylindrical treating drum disposed in a vacuum chamber and continuous plasma surface treatment for the film is effected by supplying electric power to a counter electrode disposed adjacent the side surface of the treating drum to produce plasma, while forwarding the film in one direction in synchronism with the rotation of the treating drum.

In this case, in order to increase the efficiency of the plasma surface treatment, conditions of the atmosphere for projecting high energy ions to the film are necessary. However, according to the prior art techniques described above, the treating drum is grounded and the potential difference between the treated surface and the plasma is at most only several tens of volts, even if a high frequency voltage of 13.56 MHz, which is a commercial frequency, is applied to the counter electrode to produce plasma. If the treating drum is not grounded and a negative high voltage is applied thereto, positive ions in the plasma are accelerated and in this way it is possible to increase the efficiency of the plasma surface treatment by using this energy. However, in the case where a high voltage is applied to the rotating treating drum, it gives rise to problems that (1) the mechanism becomes complicated, because a high voltage is applied to a rotating body, that (2) there is a fear that unnecessary discharge is produced, because parts other than the treated portion of the rotating drum are raised to the high voltage and that (3) when a metal film is disposed on the film, the metal film itself should be raised to the high voltage, and for this reason the feeding and rewinding mechanism is also raised to the high voltage, which complicates the insulating scheme therefor.

SUMMARY OF THE INVENTION

An object of this invention is to provide a plasma surface treatment apparatus permitting the treatment of a film by using plasma with a high treatment speed and a high efficiency without complicating uselessly the construction of the apparatus.

In order to achieve the object, according to one aspect of the present invention, in a plasma surface treatment apparatus in which film is wound on a grounded rotating electrode or rolling electrode and forwarded in one fixed direction, and gas introduced between the rotating electrode and a counter electrode disposed in a facing relationship adjacent the rotating electrode is transformed into a plasma by applying a high frequency voltage to the counter electrode, the area where the plasma is in contact with the counter electrode is made much larger than the area where the plasma is in contact with the rotating electrode.

It is known that, in the case where the effective areas of the electrodes are considerably different in a high frequency plasma, whose frequency is 100 kHz–100 MHz, the electrode having a smaller effective area becomes negative with respect to the other, i.e. the so-called self bias effect is produced. The effective area means here the area where one electrode is in contact with the plasma. Consequently, if a counter electrode having an area sufficiently larger than the area of the treatment portion of the rotating electrode, i.e. area where the electrode is in contact with the plasma is used and high frequency electric power is supplied to the counter electrode, the treatment portion of the grounded rotating electrode is raised to a negative high potential with respect to the potential of the plasma by the self bias effect. Since positive ions are accelerated by this potential difference and projected to the surface of the film, the treatment efficiency is increased considerably.

Here the concept "counter electrode having an area sufficiently larger than the area of the treatment portion of the rotating electrode" is explained more quantitatively. It is first assumed that the area where the plasma is in contact with the treatment drum is represented by $S_1$ and the area where the plasma is in contact with the counter electrode by $S_2$. When the value of $S_2/S_1$ is equal to 1, the potential differences between the plasma and the two areas are equal to each other. On the other hand, when $S_2/S_1 > 1$, the potential difference between the plasma and the treatment portion is greater than the other. This effect is realized, even if $S_2/S_1$ is slightly greater than 1. However, the potential difference between the plasma and the treatment portion is greater and the treatment efficiency is increased with increasing $S_2/S_1$. Therefore, in order to obtain a satisfactory effect in the surface reformation treatment, it is preferable that $S_2/S_1$ is greater than 1.5. Further, in the case where it is required for ions to have higher energy, such as for sputter etching, etc., it is preferable that $S_2/S_1$ is greater than 3. In addition, gas used for the plasma treatment can be selected arbitrarily, depending on the purpose of the treatment. Further, the gas pressure can be selected so as to be suitable for the purpose of the treatment.

DESCRIPTION OF THE PREFERRED EMBODIMENTS

Hereinbelow this invention will be explained, referring to FIGS. 1 to 6.

Figure 1:
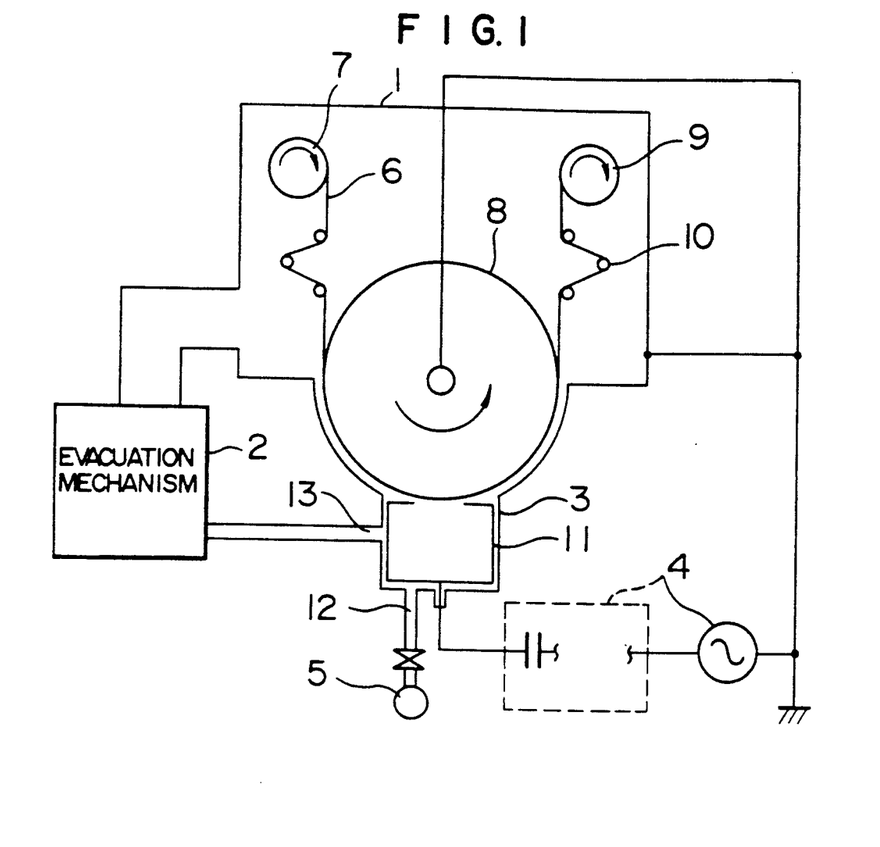
FIG. 1 is a scheme illustrating the construction of a continuous plasma surface treatment apparatus according to this invention.
Figure 2:
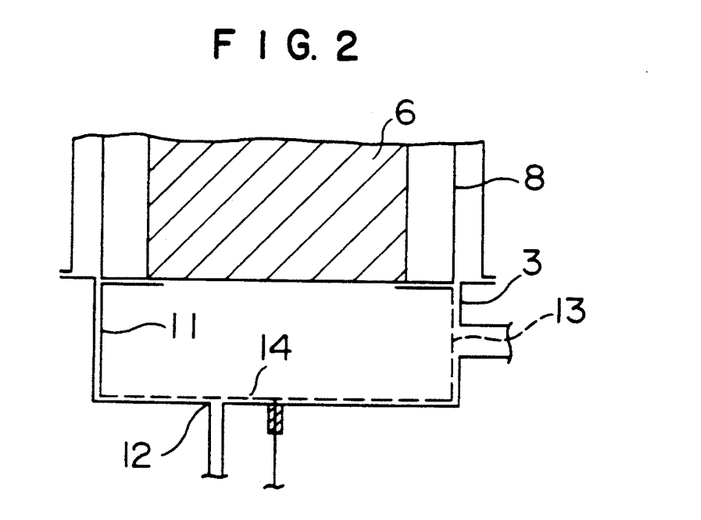
FIG. 2 shows a specific example of the construction at the neighborhood of the continuous plasma surface treatment apparatus according to this invention.

FIG. 1 illustrates schematically the construction of a continuous plasma surface treatment apparatus according to this invention, in which the apparatus consists of a vacuum chamber 1, an evacuation mechanism 2 for evacuating it, a film forwarding mechanism 7–10, a plasma surface treatment chamber 3, a high frequency voltage applying mechanism 4, and a reactive gas supplier 5. The film forwarding mechanism is constituted by a forwarding roll for forwarding a film 6, a rotating electrode 8, a rewinding roll 9, a guide roll 10 for stabilizing the tension of the film and preventing the generation of wrinkles, a driving mechanism for rotating and regulating them, and a rotation speed regulating mechanism. In the plasma surface treatment chamber 3 are disposed a counter electrode 11, a gas inlet 12 and an evacuation port 13, as indicated in the figure. In order to introduce gas uniformly into the treatment chamber 3, it is desirable to form a number of small holes 14 in the counter electrode 11, as indicated in FIG. 2, through which the gas is blown out. Further, it is preferable to cool the rotating electrode 8 and the counter electrode 11 with water in order to prevent the temperature rise thereof due to heat produced by the plasma.

Figure 7:
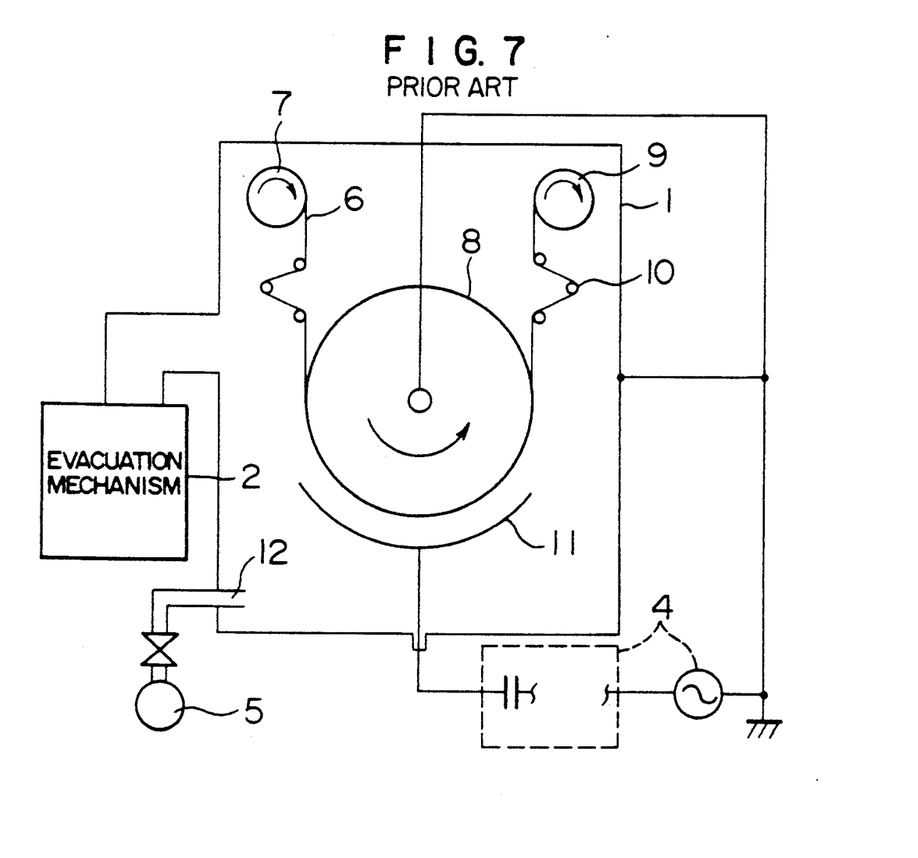
FIG. 7 is a scheme illustrating the construction of a prior art continuous plasma surface device.

The counter electrode 11 in this embodiment is constructed so as to enclose the plasma, as indicated in FIG. 2, so that the plasma is not spread to the outer periphery portion of the rotating electrode 8. In this way the area where the plasma is in contact with the counter electrode 11 is larger than the area where the plasma is in contact with the rotating electrode 8. Meanwhile, as indicated in FIG. 7, in a prior art device, since the counter electrode 11 is disposed simply along the outer periphery of the rotating electrode 8 with a constant distance therefrom and thus the plasma is spread to the outer periphery portion of the rotating electrode 8, the effect of this invention cannot be obtained. However, the form of the counter electrode 11 according to this invention is not restricted to that indicated in FIG. 1.

Figure 4:
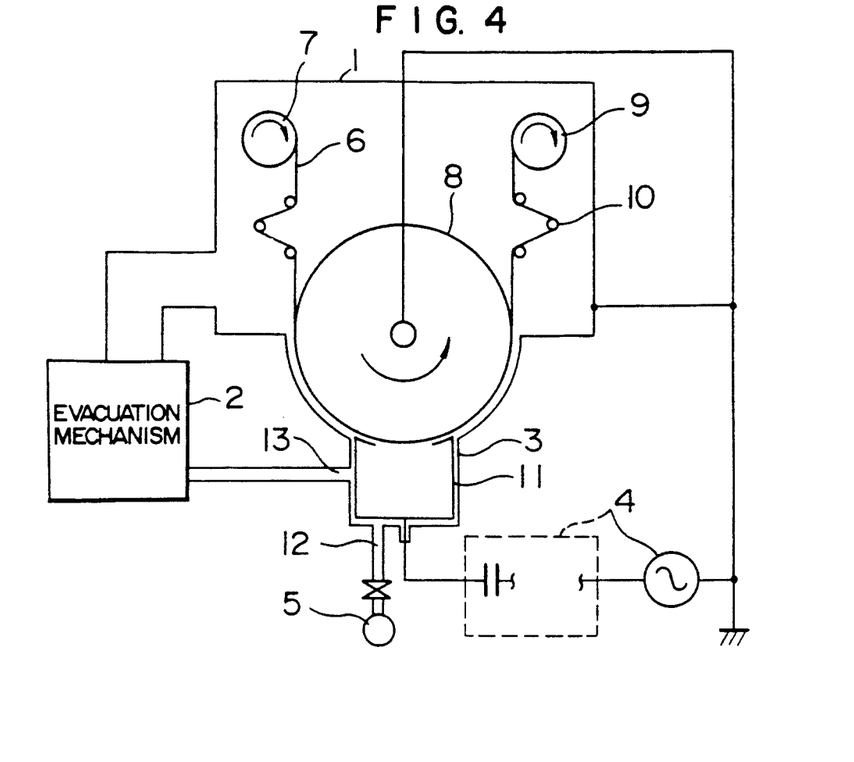
FIG. 4 is a scheme illustrating the construction of the continuous plasma surface treatment apparatus for explaining another example of the form of the counter electrode according to this invention.
Figure 5:
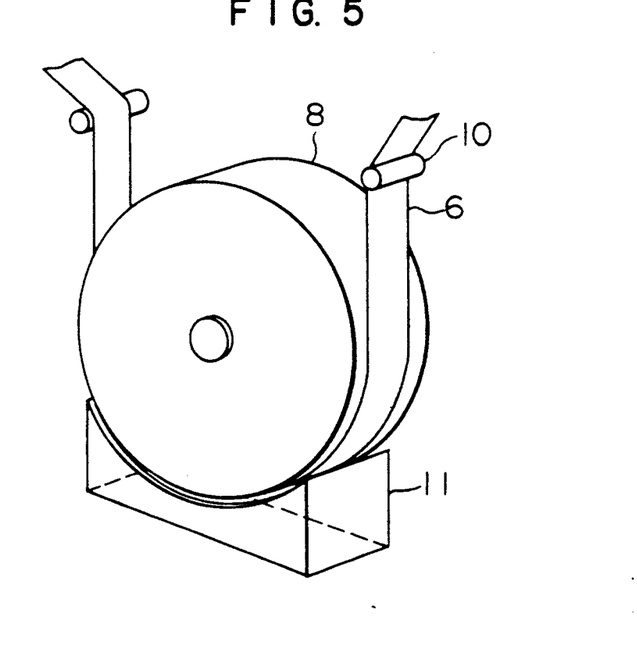
FIG. 5 is a perspective view illustrating a specific construction at the neighborhood of the counter electrode indicated in FIG. 4.

FIGS. 4 and 5 indicate another form of the counter electrode. It differs from that indicated in FIG. 1 in that the portion of the counter electrode, which is closest to the rotating electrode, is formed along the outer periphery of the rotating electrode. It is obvious from the explanation above that the effect of this invention can be obtained equally well with the form of the electrode indicated in FIG. 4.

In this case the rotating electrode 8 as well as the vacuum chamber 1 are grounded and further the area of the counter electrode is sufficiently larger than the area where the plasma is in contact with the rotating electrode 8. Now, the plasma surface treatment method utilizing the plasma surface treatment apparatus according to this invention will be explained below for the case where the plasma surface treatment is effected as a preliminary step for depositing metal on a polyester film by evaporation as an example. This step is for the purpose of increasing the adhesive strength between the metal and the polyester film by forming unevenness by etching the surface of the polyester film with an Ar plasma or by introducing polar radicals therein.

A polyester film was set in the continuous plasma surface treatment apparatus indicated in FIG. 1 and Ar gas was supplied with a constant flow rate after having evacuated the reaction chamber in vacuum. At this time the flow rate and the evacuation speed were so regulated that the gas pressure in the reaction chamber was kept at about 13.3 Pa. Then, while driving the film forwarding mechanism and rewinding the film in a determined direction, a high frequency voltage having a frequency of 13.56 MHz and an amplitude of 1 kV was applied to the counter electrode to produce plasma. The treatment effect was studied, while varying the film forwarding speed, and a satisfactory adhesive strength was obtained even with a speed of 100 m/min.

Next, a carbon film formation method utilizing the same apparatus as mentioned above will be explained below.

In this embodiment the rotating electrode 8 is grounded and a high frequency voltage of 100 kHz to 100 MHz is applied to the counter electrode 11 disposed against it. In this way a plasma of hydrocarbon gas or a mixed gas of hydrocarbon and hydrogen is produced and a carbon film is formed on the surface of a film disposed on the grounded electrode (rotating electrode 8). One of the most important features of this invention is that the area of the counter electrode 11 is sufficiently larger than the area of the treatment portion of the rotating electrode 8 (grounded electrode). In the high frequency discharge of the frequency range described above the sheath voltage drop produced by the fact that the electron mobility is considerably greater than the positive ion mobility varies depending on the ratio of the effective areas of the two electrodes and the voltage drop is great for the electrode having a small area. Here, the effective areas mean areas, where the electrodes are in contact with the plasma. Consequently, the potential of the plasma is high with respect to the potential of the surface, when the area where the counter electrode 11 is in contact with the plasma is sufficiently larger than the area of the treated portion of the rotating electrode 8 (grounded electrode), which establishes a state where high energy ions are projected to the surface of the treated portion and a hard carbon film is formed thereon.

It is desirable that the ratio of the effective areas of the treated portion of the rotating electrode 8 (grounded electrode) and the counter electrode 11 described above is at least 1:3, more preferably 1:5. In addition it is desirable that the amplitude of the high frequency voltage is greater than 1 kV.

As the hydrocarbon stated above e.g. the following gases or vapors can be used:
1) saturated aliphatic hydrocarbons such as methane, ethane, propane, butane, etc.
2) unsaturated aliphatic hydrocarbons such as ethylene, acetylene, propene, butene, butadiene, etc.
3) aromatic hydrocarbons such as benzene, naphthalene, toluene, ethylbenzene, etc.

The hard carbon film formed by this embodiment is an amorphous carbon film, in which amorphous or crystalline parts containing hydrogen atoms are mixed and which is hard and hardly worn away, having a Vickers hardness of 1000 or greater.

Now, the method for forming a hard carbon film according to this invention will be explained below more in detail, taking the case where it is applied to the step for forming a protective film for a magnetic tape by evaporation as an example.

A polyester film 10 μm thick, on one side surface of which a Co/Ni alloy magnetic thin film 0.1 μm thick was deposited by evaporation, was set in the apparatus indicated in FIG. 1. Then benzene vapor was introduced into the vacuum chamber 1 and the treatment chamber 3, after having preliminary evacuated them to a pressure not greater than $1 \times 10^{-3}$ Pa, with a constant flow rate, so that the pressure in the treatment chamber 3 was kept at 6.66 Pa, while regulating the evacuation speed. After that, a high frequency voltage having a frequency of 13.56 MHz and a voltage amplitude of 2 kV was applied to the counter electrode 11 to produce plasma. After a treatment continuously effected during 3 hours a hard carbon film uniformly 20 nm thick was formed on the whole surface of the film 900 m long. During the treatment no abnormal discharge was found. The magnetic tape thus treated was slitted to form a band 8 mm wide and used in a reproduction device for VTR. Neither tape sticking nor tape drive instabilization happened and the life of the tape was remarkably elongated with respect to that without treatment.

For comparison a device, in which the counter electrode had an area smaller than that of the treated portion, as indicated in FIG. 7, was used and a plasma surface treatment was effected under the conditions, which were otherwise identical to those described above. In this way no satisfactory adhesive strength was obtained with the film forwarding speeds not less than 10 m/min. In order to know the effect stated above more quantitatively, the film was made to stand still in the devices indicated in FIGS. 1 and 7, in which plasma was produced during a predetermined period of time, and it was found that the etching speed in the device indicated in FIG. 1 is about 10 to 20 times as high as that obtained in the device indicated in FIG. 7.

Figure 6:
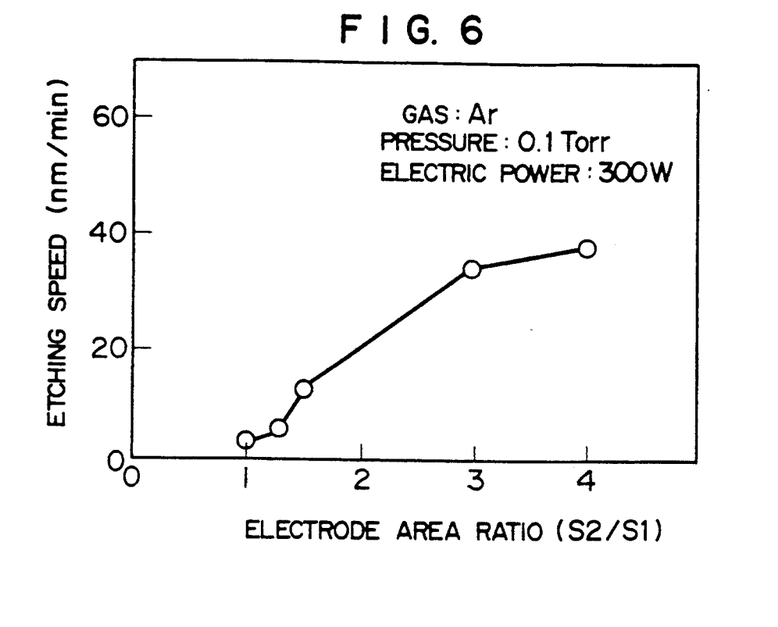
FIG. 6 is a graph showing the relation between the etching speed of a polyester film and the electrode area ratio.

In this connection, FIG. 6 shows the relation between the etching speed and the electrode area ratio, when a polyester film is etched by using the continuous plasma surface treatment device according to this invention.

The embodiment as described above can be also used with a high efficiency for electric charge preventive treatment for introducing polar radicals into films, plasma CVD, by which thin films are formed by reactive gas, plasma polymerization, etc. and it can be applied easily to these processes. Further, the above embodiment relates to the formation of a metal film on a polymer film. However, it is possible also to treat a polymer film coated with metal or metal foil in the same way.

Figure 3:
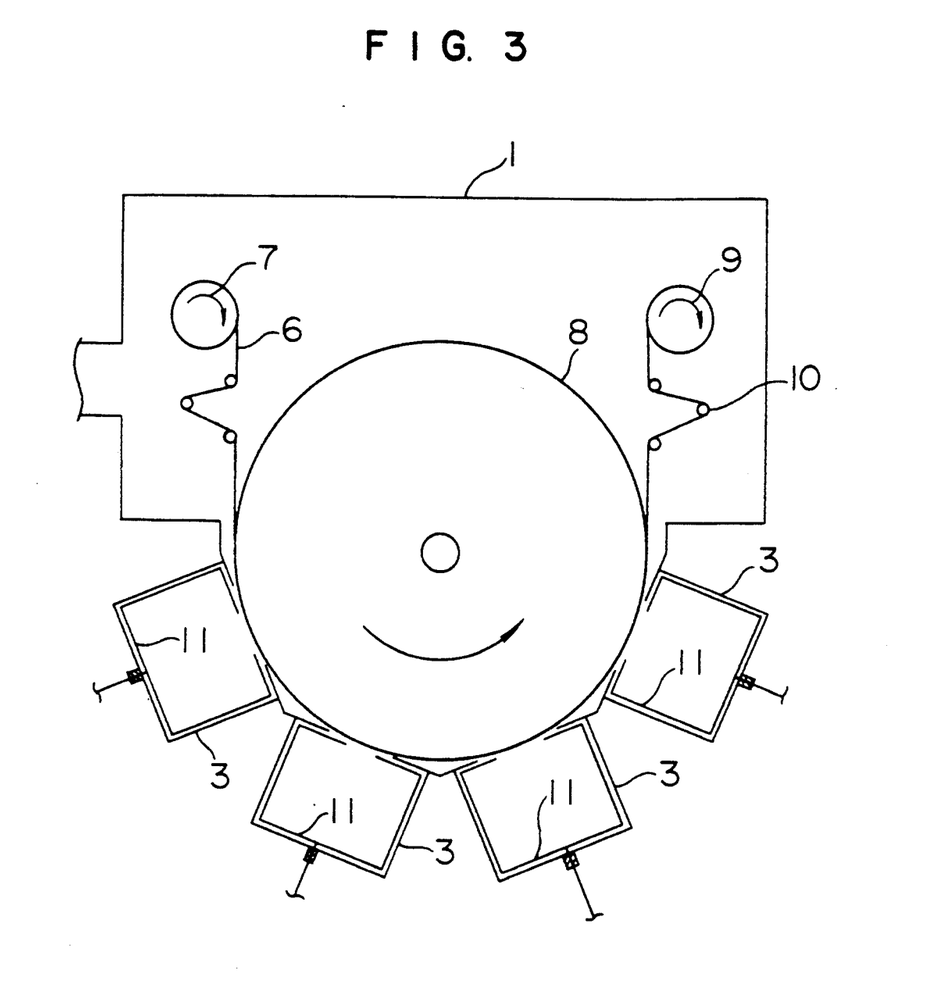
FIG. 3 shows another embodiment of the continuous plasma surface treatment apparatus according to this invention.

FIG. 3 illustrates another embodiment, in which a plurality of treatment chambers are disposed against a rotating drum in order to increase the treatment speed. With this type of device, it is possible to form a multi-layered film by varying treatment conditions and/or the kind of reactive gas for every treatment chamber or to effect other treatments such as plasma cleaning, etching, sputtering, evaporation, etc. at the same time as the formation of the carbon film by varying the structure of specified treatment chambers. In the case where the high voltage is applied to the rotating electrode 8, the device cannot have the multiple functions as described above. Consequently these multi-functional characteristics are an auxiliary effect of this invention owing to the fact that the rotating electrode 8 is grounded.

As explained above, according to this invention, advantageous effects can be obtained that it is possible to treat films by using plasma with a high treatment speed and a high efficiency.

We claim:

1. A method for depositing a film of carbon on a surface of a film with plasma comprising the steps of:
   advancing a film together with a grounded electrode in a first direction;
   providing a hollow counter electrode having an opening disposed in a facing relationship to the grounded electrode and having an inner surface, the inner surface and a portion of the grounded electrode facing the opening defining a space between the counter electrode and the grounded electrode in which a plasma is to be enclosed;
   applying a high frequency voltage to said counter electrode; and
   introducing gas containing hydrocarbons in the space between said grounded electrode and said counter electrode to produce said plasma at a treatment portion, the area of the counter electrode that is in contact with said plasma being sufficiently larger than the area of the grounded electrode that is in contact with the plasma to enhance plasma density in the neighborhood of the treatment portion.

2. The method as defined in claim 1 wherein the grounded electrode has a cylindrical surface for supporting said film that rotates in the first direction at said treatment portion.

3. The method according to claim 2 wherein the area of said counter electrode in contact with said plasma is at least 1.5 times as large as the area of the grounded electrode that is in contact with said plasma.

4. The method as defined in claim 2 wherein the area of said counter electrode that is in contact with said plasma is at least 3 times as large as the area of said grounded electrode that is in contact with said plasma.

5. A method as defined in claim 1 wherein the area of said counter electrode in contact with said plasma is at least 1.5 times as large as the area of the grounded electrode that is in contact with said plasma.

6. A method according to claim 1, wherein the area of said counter electrode that is in contact with said plasma is at least 3 times as large as the area of said grounded electrode that is in contact with said plasma.

7. A method for treating a film surface with a plasma comprising the steps of:
   winding said film in a first direction along a path including a periphery of a grounded rotating electrode;
   applying a high frequency voltage to a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed; and
   introducing gas in the space between said rotating electrode and said counter electrode to produce said plasma at the film surface, the area where the counter electrode is in contact with said plasma being sufficiently larger than the area where the rotating electrode is in contact therewith.

8. Plasma surface treating method according to claim 7, wherein the area where said counter electrode is in contact with said plasma is at least 1.5 times as large as the area where said rotating electrode is in contact therewith.

9. The method according to claim 7 further including the step of providing a voltage drop for the grounded electrode which exceeds a voltage drop for the counter electrode to thereby enhance the effectiveness of the film surface treatment.

10. A method for treating a film surface with a plasma comprising the steps of:
   winding said film in a first direction along a path including a periphery of a grounded rotating electrode;
   applying a high frequency voltage to a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed; and
   introducing gas in the space between said rotating electrode and said counter electrode to produce said plasma at the film surface, the area where the counter electrode is in contact with said plasma being sufficiently larger than the area where the rotating electrode is in contact therewith;
   wherein the area where said counter electrodes in contact with said plasma is at least 3 times as large as the area where said rotating electrode is in contact therewith.

11. A method for treating a film surface with a plasma comprising the steps of:
   winding said film in a first direction along a path including a periphery of a grounded rotating electrode;
   applying a high frequency voltage to a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed; and
   introducing gas in the space between said rotating electrode and said counter electrode to produce said plasma at the film surface, the area where the counter electrode is in contact with said plasma being sufficiently larger than the area where the rotating electrode is in contact therewith;
   which includes providing the counter electrode with a number of small holes and introducing said gas uniformly into a treatment chamber formed by the counter electrode and the rotating electrode through said holes.

12. A method for treating a film surface with a plasma comprising the steps of:
   winding said film in a first direction along a path including a periphery of a grounded rotating electrode;
   applying a high frequency voltage to a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed; and
   introducing gas in the space between said rotating electrode and said counter electrode to produce said plasma at the film surface, the area where the counter electrode is in contact with said plasma being sufficiently larger than the area where the rotating electrode is in contact therewith;
   which includes cooling said counter electrode and said rotating electrode with water.

13. A plasma surface treatment apparatus comprising:
   a grounded electrode having a treatment portion;
   means for contacting the treatment portion with a member to be treated;
   a hollow counter electrode having an opening facing the treatment portion and having an inner surface, the inner surface and the treatment portion defining a space between the treatment portion and the counter electrode in which a plasma is to be enclosed;
   means for introducing a gas into the space between the treatment portion and the counter electrode; and
   means for applying a voltage to the counter electrode to form a plasma from the gas and for causing the plasma to contact the number at the treatment portion through the opening;
   wherein an area of the counter electrode which contacts the plasma is larger than an area of the treatment portion.

14. A plasma surface treatment apparatus according to claim 13, further comprising means for providing relative motion between the member and the counter electrode.

15. A plasma surface treatment apparatus according to claim 14, wherein the grounded electrode is movable, and wherein the means for providing relative motion comprises means for moving the grounded electrode together with the member relative to the counter electrode.

16. A plasma surface treatment apparatus according to claim 14, wherein the grounded electrode is rotatable, and wherein the means for providing relative motion comprises means for rotating the grounded electrode together with the member relative to the counter electrode.

17. A plasma surface treatment apparatus according to claim 13, wherein the voltage has a frequency which is selected to cause the treatment portion to be raised to a potential with respect to the plasma by virtue of a self-bias effect.

18. A plasma surface treatment apparatus according to claim 17, wherein the potential with respect to the plasma to which the treatment portion is raised is a negative potential.

19. A plasma surface treatment apparatus according to claim 17, wherein the frequency is selected from the range of 100 kHz to 100 MHz.

20. Plasma surface treatment apparatus for treating a film with plasma, comprising:
   a grounded rotating electrode;
   a plurality of hollow counter electrodes positioned around the periphery of and having respective openings disposed in a facing relationship to said rotating electrode and having respective inner surfaces, the respective inner surfaces and respective portions of a surface of the rotating electrode facing the respective openings defining respective spaces between the rotating electrode and the counter electrodes in which respective plasmas are to be enclosed;

means for winding said film in a fixed direction around said grounded rotating electrode;

means for applying a high frequency voltage to said counter electrodes positioned around the periphery of said rotating electrode; and means for introducing gas in the respective spaces between said rotating electrode and said counter electrodes to produce said respective plasmas and for causing the respective plasmas to contact said film at respective treatment areas, said counter electrodes having respective areas which are in contact with the respective plasmas that are sufficiently larger than respective corresponding areas of said rotating electrode which are in contact with the respective plasmas.

21. Plasma surface treatment apparatus according to claim 20, wherein each of the respective areas where said counter electrodes are in contact with said respective plasmas is at least 1.5 times as large as the respective corresponding area where said rotating electrode is in contact therewith.

22. Plasma surface treatment apparatus according to claim 20, wherein each of the respective areas where said counter electrodes are in contact with said respective plasmas is at least 3 times as large as the respective corresponding area where said rotating electrode is in contact therewith.

23. Plasma surface treatment apparatus according to claim 20, wherein the counter electrodes and the rotating electrode form a plurality of respective treatment chambers including the respective treatment areas and the counter electrodes contain a number of small holes so that said gas is introduced uniformly therethrough into said respective treatment chambers.

24. Plasma surface treatment apparatus according to claim 6, further including means for cooling said counter electrodes and said rotating electrode with water.

25. Plasma surface treatment apparatus according to claim 20, wherein the treatment is for etching a surface of a polyester film and wherein the respective plasma contacting areas of the counter electrodes are sufficiently larger than the respective corresponding plasma contacting areas of the rotating electrode to provide a voltage drop for the rotating electrode which exceeds respective voltage drops for the counter electrodes to enhance the effectiveness of the treatment.

26. Plasma surface treatment apparatus for treating a film with plasma, comprising:

a grounded rotating electrode;

a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed;

means for winding said film in a fixed direction around a portion of said grounded rotating electrode;

means for applying a high frequency voltage to said counter electrode; and means for introducing gas in the space between said rotating electrode and said counter electrode to produce said plasma and for causing the plasma to contact said film at a treatment area, said counter electrode having an area which is in contact with the plasma that is sufficiently larger than a corresponding area of said rotating electrode which is in contact with said plasma.

27. Plasma surface treatment apparatus according to claim 1, wherein the area where said counter electrode is in contact with said plasma is at least 1.5 times as large as the area where said rotating electrode is in contact therewith.

28. Plasma surface treatment apparatus according to claim 26 wherein the treatment is for etching a surface of a polyester film and wherein the plasma contacting area of the counter electrode is sufficiently larger than the plasma contacting area of the grounded electrode to provide a voltage drop for the grounded electrode which exceeds voltage drop for the counter electrode to enhance the effectiveness of the treatment.

29. Plasma surface treatment apparatus for treating a film with plasma, comprising:

a grounded rotating electrode;

a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed;

means for winding said film in a fixed direction around a portion of said grounded rotating electrode;

means for applying a high frequency voltage to said counter electrode; and means for introducing gas in the space between said rotating electrode and said counter electrode to produce said plasma and for causing the plasma to contact said film at a treatment area, said counter electrode having an area which is in contact with the plasma that is sufficiently larger than a corresponding area of said rotating electrode which is in contact with said plasma;

wherein the area where said counter electrode is in contact with said plasma is at least 3 times as large as the area where said rotating electrode is in contact therewith.

30. Plasma surface treatment apparatus for treating a film with plasma, comprising:

a grounded rotating electrode;

a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed;

means for winding said film in a fixed direction around a portion of said grounded rotating electrode;

means for applying a high frequency voltage to said counter electrode; and means for introducing gas in the space between said rotating electrode and said counter electrode to produce said plasma and for causing the plasma to contact said film at a treatment area, said counter electrode having an area which is in contact with the plasma that is sufficiently larger than a corresponding area of said rotating electrode which is in contact with said plasma;

wherein the counter electrode and the rotating electrode form a treatment chamber including said treatment area and the counter electrode contains a number of small holes so that said gas is introduced uniformly therethrough into the treatment chamber.

31. Plasma surface treatment apparatus for treating a film with plasma, comprising:

a grounded rotating electrode;

a hollow counter electrode having an opening disposed in a facing relationship to said rotating electrode and having an inner surface, the inner surface and a portion of a surface of the rotating electrode facing the opening defining a space between the rotating electrode and the counter electrode in which a plasma is to be enclosed;

means for winding said film in a fixed direction around a portion of said grounded rotating electrode;

means for applying a high frequency voltage to said counter electrode;

means for introducing gas in the space between said rotating electrode and said counter electrode to produce said plasma and for causing the plasma to contact said film at a treatment area, said counter electrode having an area which is in contact with the plasma that is sufficiently larger than a corresponding area of said rotating electrode which is in contact with said plasma; and means for cooling said counter electrode and said rotating electrode with water.

32. Plasma surface treatment apparatus for treatment of a surface of a film with plasma comprising:

a grounded electrode;

said grounded electrode allowing said film to advance relative to said plasma in a determined direction while said film lies on a part of said grounded electrode;

a hollow counter electrode having an opening disposed in a facing relationship to said grounded electrode and having an inner surface, the inner surface and a portion of a surface of the grounded electrode facing the opening defining a space between the grounded electrode and the counter electrode in which a plasma is to be enclosed;

means for applying a high frequency voltage to said counter electrode; and means for introducing gas in the space between said grounded electrode and said counter electrode to produce said plasma and for causing the plasma so produced to contact said film at a treatment area;

wherein the area of said counter electrode that is in contact with the plasma is sufficiently larger than the area of the grounded electrode that is in contact with the plasma to enhance plasma density in the neighborhood of the treatment area.

33. Plasma surface treatment apparatus for etching a film with plasma, comprising:

a grounded rotating electrode;

a plurality of hollow counter electrodes positioned around the periphery of and having openings disposed in a facing relationship to said rotating electrode and having inner surfaces, the inner surfaces and portions of a surface of the rotating electrode facing the openings defining spaces between the rotating electrode and the counter electrodes in which plasmas are to be enclosed;

means for winding said film in a fixed direction around said grounded electrode;

means for applying a high frequency voltage to said counter electrodes;

means for introducing gas in the spaces between the rotating electrode and said counter electrodes to produce said plasmas and for causing the plasmas to contact said film at a plurality of treatment areas that open against the rotating electrode through the openings at spaced positions around the periphery of the grounded rotating electrode; and means disposed on said counter electrodes to reduce areas of the treatment areas that open against the rotating electrode through the openings thereby to provide said counter electrodes with surface areas in contact with the plasmas that collectively are larger than the areas where the plasmas are in contact with the rotating electrode to thereby enhance the effectiveness of the treatment.

* * * * *